United States Patent
Muquit et al.

(10) Patent No.: US 8,374,419 B2
(45) Date of Patent: Feb. 12, 2013

(54) REGISTERING DEVICE, CHECKING DEVICE, PROGRAM, AND DATA STRUCTURE

(75) Inventors: Mohammad Abdul Muquit, Kanagawa (JP); Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 626 days.

(21) Appl. No.: 12/600,030

(22) PCT Filed: May 14, 2008

(86) PCT No.: PCT/JP2008/059298
§ 371 (c)(1),
(2), (4) Date: Nov. 13, 2009

(87) PCT Pub. No.: WO2008/143271
PCT Pub. Date: Nov. 27, 2008

(65) Prior Publication Data
US 2010/0226558 A1 Sep. 9, 2010

(30) Foreign Application Priority Data
May 15, 2007 (JP) .................................. 2007-129524

(51) Int. Cl.
*G06K 9/00* (2006.01)
(52) U.S. Cl. ........................................ 382/134; 382/128
(58) Field of Classification Search .................. None
See application file for complete search history.

(56) References Cited

U.S. PATENT DOCUMENTS

| 7,599,529 | B2 * | 10/2009 | Fujii | 382/124 |
|---|---|---|---|---|
| 7,634,116 | B2 * | 12/2009 | Sato | 382/124 |
| 8,103,060 | B2 * | 1/2012 | Abe | 382/115 |
| 2003/0088165 | A1 * | 5/2003 | Smith et al. | 600/323 |

FOREIGN PATENT DOCUMENTS

| EP | 1 562 136 A1 | 8/2005 |
|---|---|---|
| JP | 6-274630 | 9/1994 |
| JP | 2003-303178 | 10/2003 |
| JP | 2004-54698 | 2/2004 |
| JP | 2005-122480 | 5/2005 |
| JP | 2006-330872 | 12/2006 |

OTHER PUBLICATIONS

Di Ruberto C.; "Recognition of Shapes by Attributed Skeletal Graphs", Pattern Recognition, Elsevier, GB, vol. 37, No. 1, Jan. 1, 2004, pp. 21-31.

Luciano Da Fontoura Costa et al: "Shape Concepts" Jan. 1, 2001, Shape Analysis and Classification: Theory and Practice, GB, pp. 265-273.

(Continued)

*Primary Examiner* — Chan S Park
*Assistant Examiner* — Nancy Bitar
(74) *Attorney, Agent, or Firm* — Finnegan, Henderson, Farabow, Garrett & Dunner, L.L.P.

(57) ABSTRACT

A registering device, a collating device, and a program which are capable of improving authentication accuracy and a data configuration of identification data capable of improving reliability are proposed. Parameters representing shapes of partial lines obtained by dividing a blood vessel line appearing in an image by setting end points and branch points of the blood vessel line as reference points are extracted and data including the parameters of the partial lines and positions of points of opposite ends of the partial lines is generated as data identifying a live body.

13 Claims, 11 Drawing Sheets

OTHER PUBLICATIONS

Anonymous: "Published International Standards Developed by ISO/IEC JTC 1/SC 37—Biometrics". 20070486 Apr. 6, 2007, pp. 1-5.

Johnson R Ed—Bankman I N (Editor): "Arterial Tree Morphometry", Jan. 1, 2000, Handbook of Medical Imaging—Processing and Analysis; [Academic Press Series in Biomedical Engineering,] Academic Press, San Diego, Calif. pp. 261-283.

Jain L C (Ed) et al: "Chapter 2 (part): Fingerprint Feature Processing Techniques and Poroscopy in: Intelligent Biometric Techniques in Fingerprint and Face Recognition", Jan. 1, 1999, pp. 56-60.

ISO/IEC 19794-9:2007—Information Technology—Biometric Data Interchange Formats—Part 9: Vascular Image Data International Standard ISO/IEC Jan. 1, 2007 pp. 1-24.

"$2^{nd}$ Working Draft Text for 19794-3, Biometric Data Interchange Formats Part 3: Finger Pattern Data", International Standard ISO/IEC, JTC Working Draft Text, XX, XX, vol. 1/SC 37 N313, Oct. 3, 2003, p. 27pp.

Luciano Da Fontoura Costa et al: "Shape Analysis and Classifoication: Theory and Practice Passage", Jan. 1, 2001, Shape Analysis and Classification: Theory and Practice, CRC Press, pp. 78-85.

\* cited by examiner

FIG. 3
(A) BEFORE CONVERSION
(B) AFTER CONVERSION

FIG. 9

| $x_1$ | $y_1$ |
|---|---|
| $x_2$ | $y_2$ |
| $x_3$ | $y_3$ |
| ⋮ | ⋮ |
| $x_N$ | $y_N$ |

~FL1

| $I_{S1}$ | $I_{E1}$ | $L_1$ | $\theta_1$ | $C_1$ |
|---|---|---|---|---|
| $I_{S2}$ | $I_{E2}$ | $L_2$ | $\theta_2$ | $C_2$ |
| $I_{S3}$ | $I_{E3}$ | $L_3$ | $\theta_3$ | $C_3$ |
| ⋮ | ⋮ | ⋮ | ⋮ | ⋮ |
| $I_{SM}$ | $I_{EM}$ | $L_M$ | $\theta_M$ | $C_M$ |

~FL2

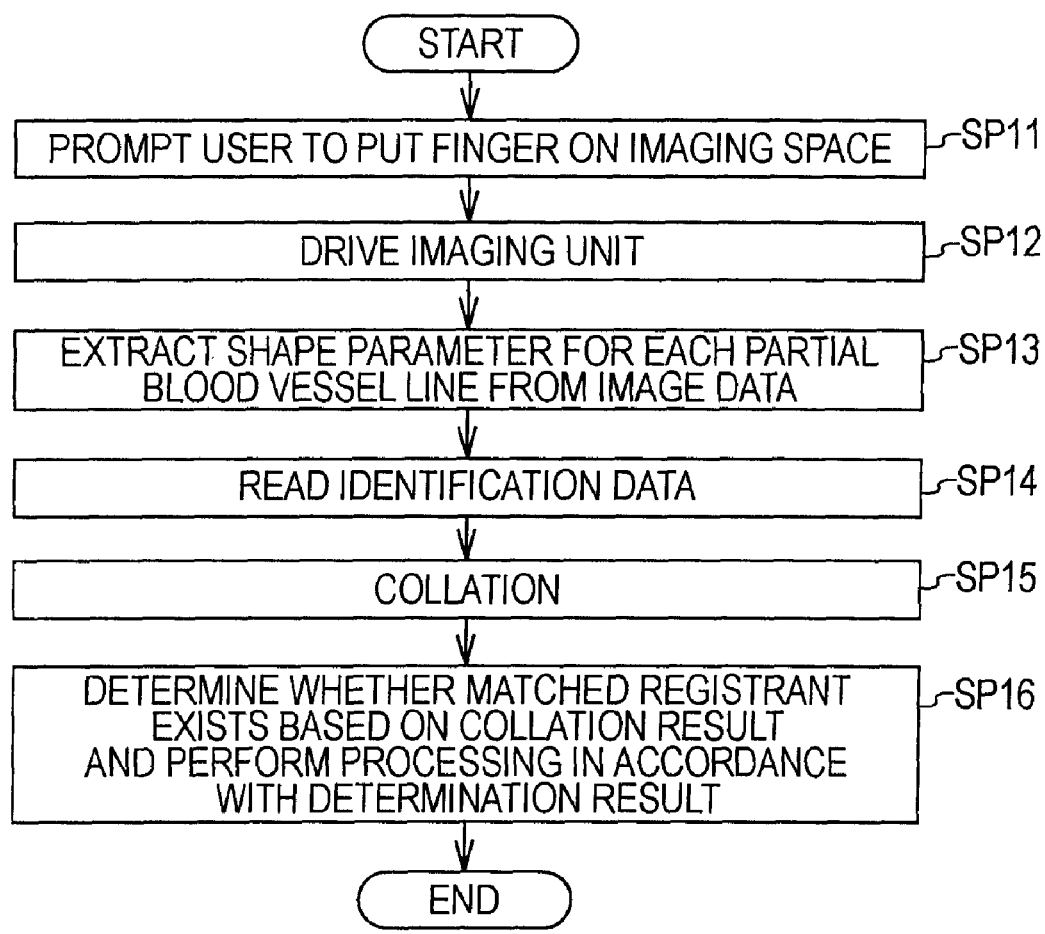

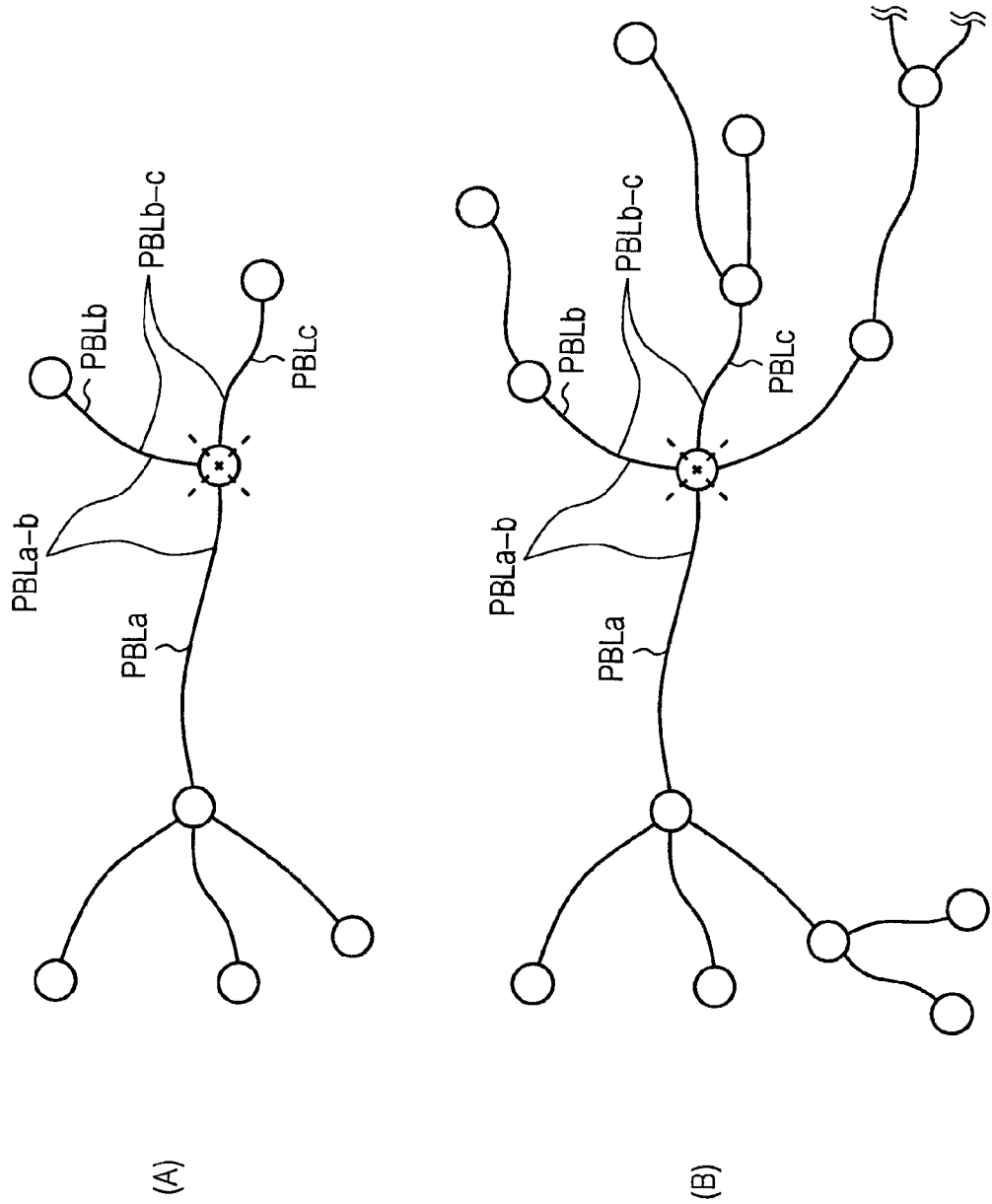

REGISTERING DEVICE, CHECKING DEVICE, PROGRAM, AND DATA STRUCTURE

CROSS REFERENCE TO RELATED APPLICATIONS

This application is a national phase application based on PCT/JP2008/059298, filed May 14, 2008, which claims the priority of Japanese Patent Application No. 2007-129524, filed May 15, 2007, the contents of all of which are incorporated herein by reference.

TECHNICAL FIELD

The present invention relates to a registering device, a collating device, a program, and a data configuration and is suitably applicable to a case where biometrics authentication is performed.

BACKGROUND ART

Conventionally, an example of a target of biometrics authentication includes blood vessels. As a related art of such a technique, an authentication device which extracts, as feature points, end points and branch points of blood vessels shown in a captured image and generates data of a registration target or data for comparison with the registration target using the extracted feature points has been proposed (refer to Patent Document 1, for example). In this authentication device, an amount of usage of a memory for storage can be considerably reduced when compared with a case where image data is directly registered.
Patent Document 1: Japanese Unexamined Patent Application Publication No. 2003-303178

However, since the end points and the branch points are discretely distributed in the blood vessels, they have less reliability as elements to be used to discriminate a registrant. Accordingly, even if a method for generating a feature point as data of a comparison target is the same as a method for generating a feature point as data of a registration target, there arises a problem in that it is highly possible that an error is made in a determination such that a third party is determined as a certain person or a certain person is determined as a different person due to an external factor such as an environment of imaging operation or noise, or an internal factor such as difficulty of imaging of blood vessels in a live body (which is different between individuals), that is, authentication accuracy (accuracy of discrimination of a registrant) is poor.

DISCLOSURE OF INVENTION

The present invention is made taking the above points into consideration, and a registering device, a collating device, and a program which are capable of improving authentication accuracy and a data configuration of identification data capable of improving reliability are proposed.

To address these problems, the present invention provides a registering device including extracting means for extracting parameters representing shapes of partial lines obtained by dividing a blood vessel line appearing in an image by setting end points and branch points of the blood vessel line as reference points, and generating means for generating data including the parameters of the partial lines and positions of points of opposite ends of the partial lines.

Furthermore, the present invention provides a collating device including storing means for storing data including parameters representing shapes of partial lines obtained by dividing a blood vessel line appearing in an image by setting end points and branch points of the blood vessel lines as reference points and positions of points of the opposites ends of the partial lines, and collating means for collating the parameters and the points of the opposite ends of the partial lines with collation targets as elements for a discrimination of a registrant.

Furthermore, the present invention provides a program causing extracting means to extract parameters representing shapes of partial lines obtained by dividing a blood vessel line appearing in an image by setting end points and branch points of the blood vessel line as reference points, and generating means to generate data including the parameters of the partial lines and positions of points of opposite ends of the partial lines.

Moreover, the present invention provides a data configuration of identification data generated as an object to be registered. The identification data has a configuration including parameters representing shapes of partial lines obtained by dividing a blood vessel line appearing in an image by setting end points and branch points of the blood vessel line as reference points and positions of points of opposite ends of the partial lines, and the parameters and the points of the opposite ends of the partial lines are used as elements for discrimination of a registrant when processing for collation with objects to be collated is performed.

As described above, according to the present invention, since, in addition to the points representing the features of the blood vessel lines, the shapes of the blood vessel lines are extracted as parameters of partial lines obtained by dividing blood vessel lines by setting the feature points as reference points so that the blood vessel lines are discretely shown in a state in which the shapes have certain relationships with the blood vessel lines, adverse effects due to an external factor such as an environment of imaging operation or noise, or an internal factor such as difficulty of imaging of blood vessels in a live body (which is different between individuals) can be reduced. Consequently, a registering device, a collating device, and a program which are capable of improving authentication accuracy and a data configuration of identification data capable of improving reliability can be realized.

BRIEF DESCRIPTION OF DRAWINGS

FIG. 3 shows schematic diagrams illustrating an image before pattern returning and an image after pattern returning.

FIG. 9 is a schematic diagram illustrating an example of a data configuration of identification data.

FIG. 10 is a flowchart illustrating a procedure of authentication processing.

FIG. 11 is a schematic diagram used to describe connection of partial vessel lines.

BEST MODES FOR CARRYING OUT THE INVENTION

An embodiment of the present invention will be described in detail with reference to the accompanying drawings.

1. Entire Configuration of Authentication Device

Figure 1:
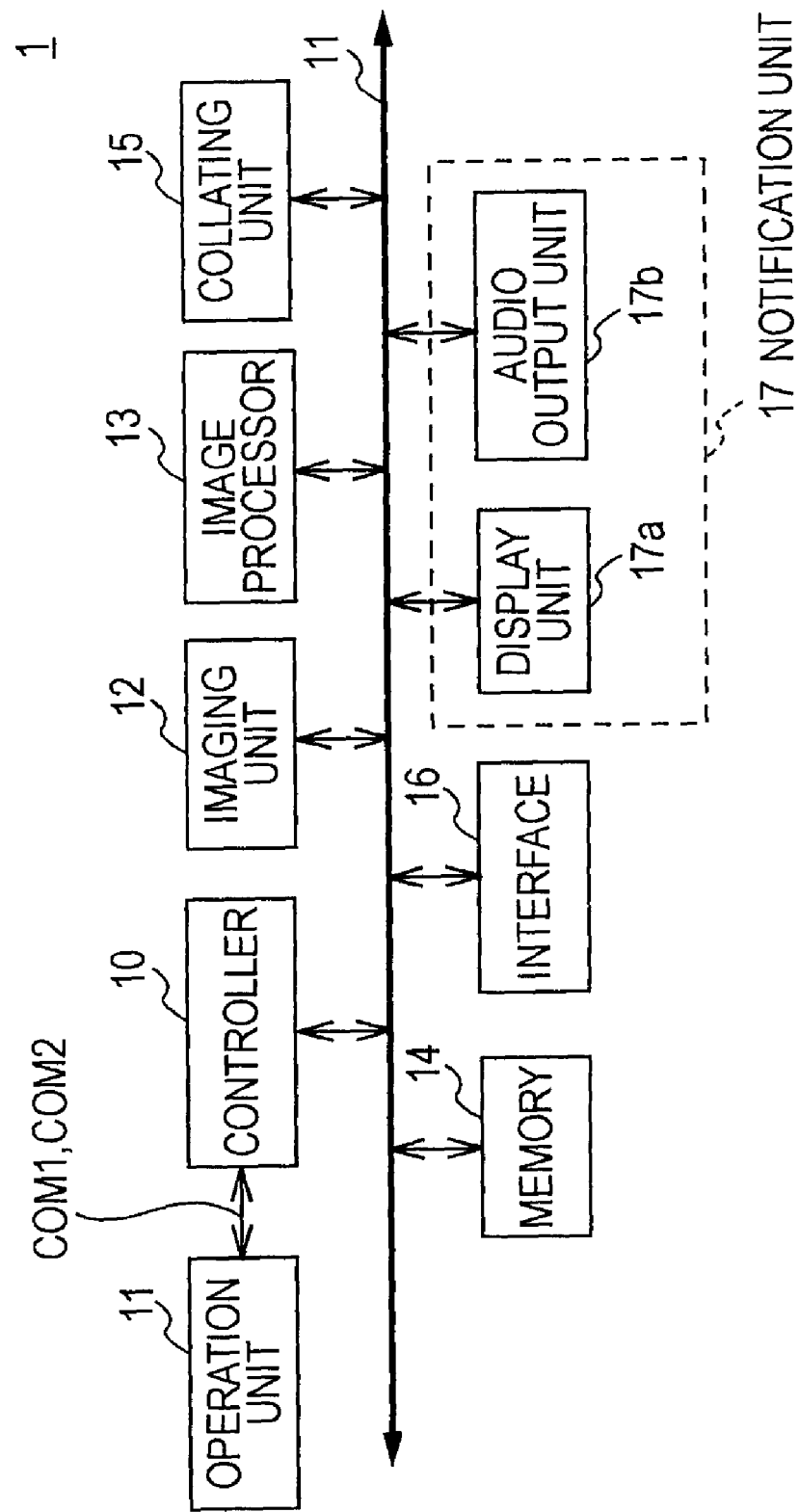
FIG. 1 is a block diagram illustrating an entire configuration of an authentication device according to an embodiment.

FIG. 1 shows an entire configuration of an authentication device 1 according to an embodiment. This authentication device 1 is configured such that an operation unit 11, an imaging unit 12, an image processor 13, a memory 14, a collating unit 15, an interface 16, and a notification unit 17 are connected to a controller 10 through a bus 16.

The controller 10 is configured as a computer including a CPU (Central Processing Unit) which controls the entire authentication device 1, a ROM (Read Only Memory) which stores various programs and setting information, for example, and a RAM (Random Access Memory) serving as a work memory for the CPU.

In the controller 10, an execution command COM1 for executing a mode in which blood vessels of a user to be registered (hereinafter referred to as a "registering person") are registered (hereinafter referred to as a "blood vessel registration mode") or an execution command COM2 for executing a mode in which a determination is made as to whether a registering person has been registered (hereinafter referred to as an "authentication mode") is input from the operation unit 11 in accordance with a user's operation.

The controller 10 determines a mode to be executed in accordance with the execution command COM1 or COM2, and appropriately controls the imaging unit 12, the image processor 13, the memory 14, the collating unit 15, the interface 16, and the notification unit 17 in accordance with a program corresponding to a result of the determination so as to execute the blood vessel registration mode or the authentication mode.

The imaging unit 12 includes a camera which sets a region on which a finger is put in a case of the authentication device 1 as an imaging space, and controls a position of an optical lens of the camera, an aperture value of an aperture, and a shutter speed (exposure time) of an imaging device with reference to setting values set by the controller 10.

Furthermore, the imaging unit 12 includes a near-infrared light source which emits near-infrared light to the imaging space, turns on the near-infrared light source for a period specified by the controller 10, performs an image pickup of an object image projected on an imaging plane of the imaging device in a predetermined cycle, and successively outputs image data representing an image generated as a result of the image pickup to the controller 10.

Here, in a case where a finger, for example, is put on the imaging space, near-infrared light emitted from the near-infrared light source through an inside of the finger is incident on the imaging device through the optical system and the aperture of the camera as light for projecting blood vessels, and the blood vessels inside the finger are projected on the imaging plane of the imaging device. Accordingly, in this case, the blood vessels are included in an image projected based on image data generated as a result of image pickup performed by the imaging unit 12.

The image processor 13 detects points (hereinafter referred to as "feature points") representing features of the blood vessel lines included in the projected image and extracts parameters (hereinafter referred to as "shape parameters") representing shapes of portions of the blood vessel lines (hereinafter referred to as "partial blood vessel lines") for individual partial blood vessel lines divided in accordance with the feature points.

The memory 14 corresponding to a flash memory, for example, stores data in a region specified by the controller 10 or reads data stored in the region.

The collating unit 15 collates opposite ends of partial blood vessel lines corresponding to the shape parameters extracted by the image processor 13 with opposite ends of partial blood vessel lines corresponding to shape parameters registered in the memory 14, and if a displacement amount of the points is equal to or larger than a threshold value, notifies the controller 10 of the fact.

On the other hand, when the displacement amount is smaller than the threshold value, the collating unit 15 collates the shape parameters extracted by the image processor 13 with the shape parameters registered in the memory 14, and notifies results of the collations to the controller 10.

The interface 16 transmits various data to and receives various data from an external device connected through a predetermined transmission line.

The notification unit 17 includes a display unit 17a and an audio output unit 17b. The display unit 17a displays characters and graphics based on display data supplied from the controller 10 in a display screen. On the other hand, the audio output unit 17b outputs audio based on audio data supplied from the controller 10 from a speaker.

2. Configuration of Image Processor

Figure 2:
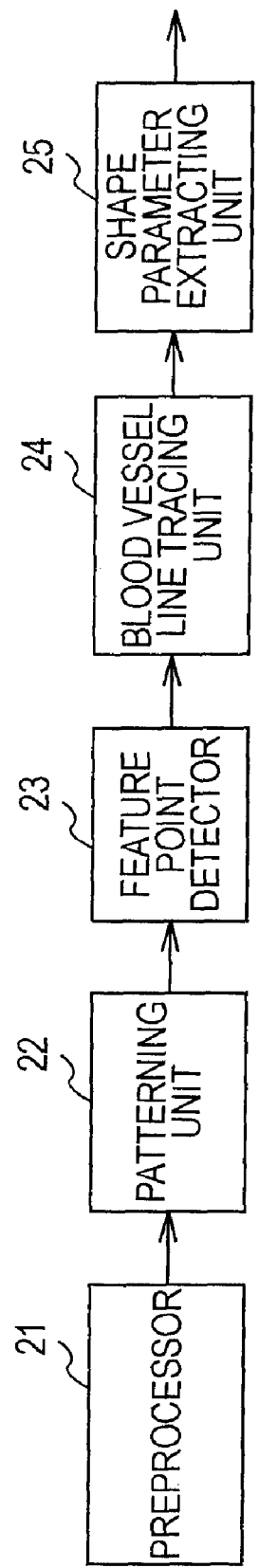
FIG. 2 is a block diagram illustrating a configuration of an image processor.

Next, the image processor 13 will be described in detail. As shown in FIG. 2, the image processor 13 includes a preprocessor 21, a patterning unit 22, a feature point detector 23, a blood vessel tracing unit 24, and a shape parameter extracting unit 25.

2-1. Image Preprocessing

The preprocessor 21 performs preprocessing including image rotation correction, noise removal, and image extraction on image data supplied from the imaging unit 12 through the controller 10, and transmits resultant image data obtained after the processing to the patterning unit 22.

2-2. Patterning of Blood Vessels

The patterning unit 22 performs patterning (conversion) on a multilevel image represented by the image data so as to obtain a binary image in which the blood vessel lines having the same widths appear. In this embodiment, the patterning unit 22 performs the patterning so as to obtain a binary image in which each of the blood vessel lines has a width corresponding to one pixel. A method of the patterning will be described in detail.

The patterning unit 22 performs differential filter processing such as a Gaussian filter or a Log filter on the image data so as to clearly show contours of the blood vessels appearing in the image, and converts the image in which the contours are clearly shown into a binary image with a set luminance value as a reference.

Then, the patterning unit 22 extracts the blood vessel lines each of which has a line width of one pixel with the centers or luminance peaks of the widths of the blood vessel lines which appear in the binary image as references.

Here, the image before the pattern conversion and the image after the pattern conversion are shown in FIG. 3. As is apparent from these examples of FIG. 3, the patterning unit 22 generates the binary image (FIG. 3(B)) in which the vessel lines having the same widths appear from the multilevel image (FIG. 3(A)) obtained after the preprocessing.

2-3. Detection of Feature Points

The feature point detector 23 detects points representing features (hereinafter referred to as "feature points") from among points (pixels) included in the blood vessel which appear in the binary image. An example of a method for this detection will be described in detail. Note that although the pixels included in the blood vessel lines appearing in the binary image correspond to white pixels or black pixels, a description will be made assuming that the pixels correspond to the white pixels in this embodiment.

Each of the pixels included in the binary image is successively determined as a pixel of interest in a predetermined order. When the pixel of interest is a white pixel, the feature point detector 23 checks the number of white pixels among pixels (eight pixels in total including four pixels in vertical and horizontal directions and four pixels in diagonal directions) surrounding the pixel.

Figure 4:
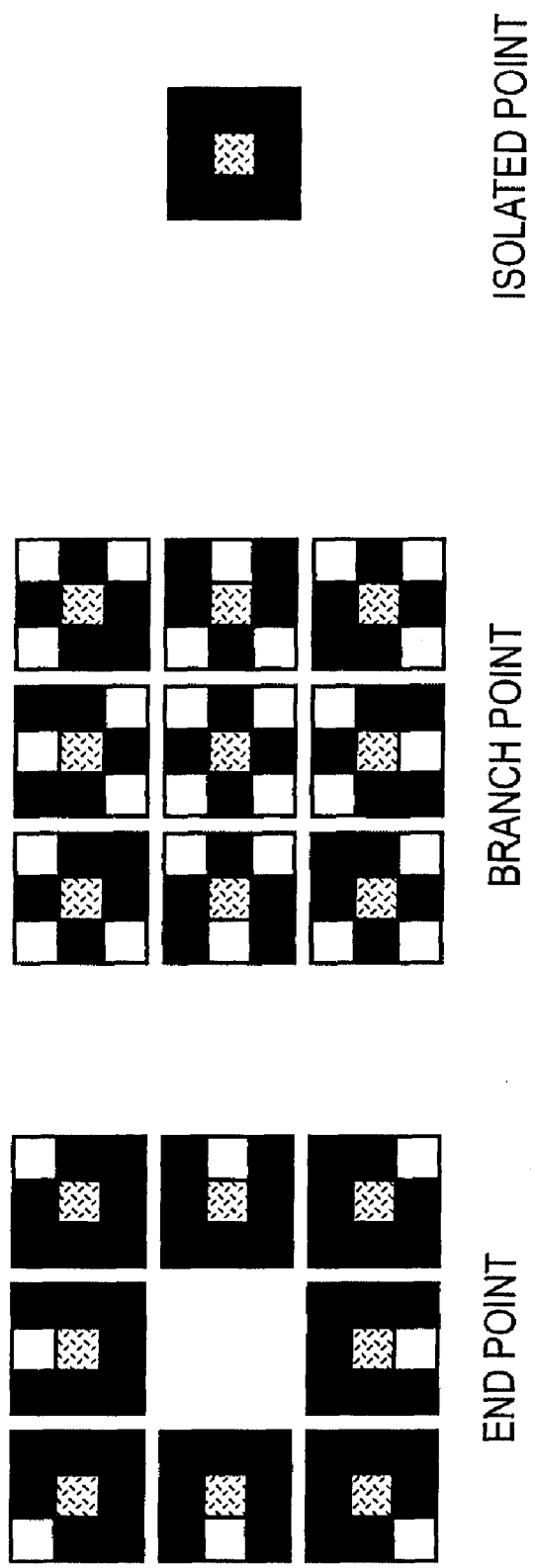
FIG. 4 show schematic diagrams illustrating appearance patterns of white pixels surrounding end points, branch points, and an isolated point.

Here, appearance patterns of end points, branch points, and an isolated point included in the blood vessel lines are shown in FIG. 4. As is apparent from FIG. 4, when each of the blood vessels is shown so as to have a width of one pixel, the relationship between "the number" of white pixels surrounding the pixel of interest which is a white pixel and each of the end points, each of the branch points, or the isolated point is uniquely determined. Furthermore, a three-branch pattern or a four-branch pattern is used as a branch pattern.

Figure 5:
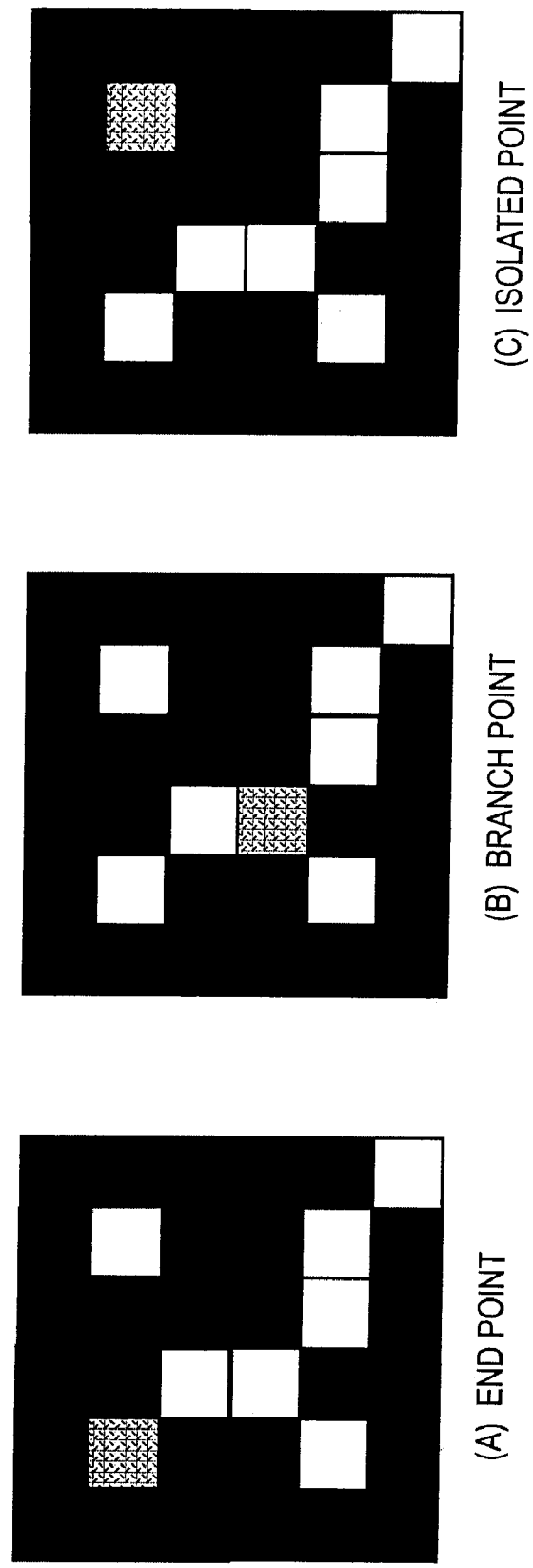
FIG. 5 show schematic diagrams used to describe detections of an end point, a branch point, and an isolated point.

As shown in FIG. 5, in a case where one pixel is included in a region surrounding the pixel of interest which is a white pixel (FIG. 5(A)), the feature point detector 23 detects the pixel of interest as an end point of a blood vessel line. On the other hand, in a case where three white pixels are included in the region surrounding the pixel of interest which is the white pixel (FIG. 5(B)), the feature point detector 23 detects the pixel of interest as a branch point. Furthermore, in a case where four white pixels are disposed in the region surrounding the pixel of interest which is the white pixel (not shown), the feature point detector 23 detects the pixel of interest as a branch point. On the other hand, in a case where a white pixel is not included in the region surrounding the pixel of interest which is the white pixel, the feature point detector 23 detects the pixel of interest as an isolated point.

Then, the feature point detector 23 deletes the isolated point which doe not serve as a component of a blood vessel line from among the detected end points, the detected branch points, and the detected isolated point.

Figure 6:
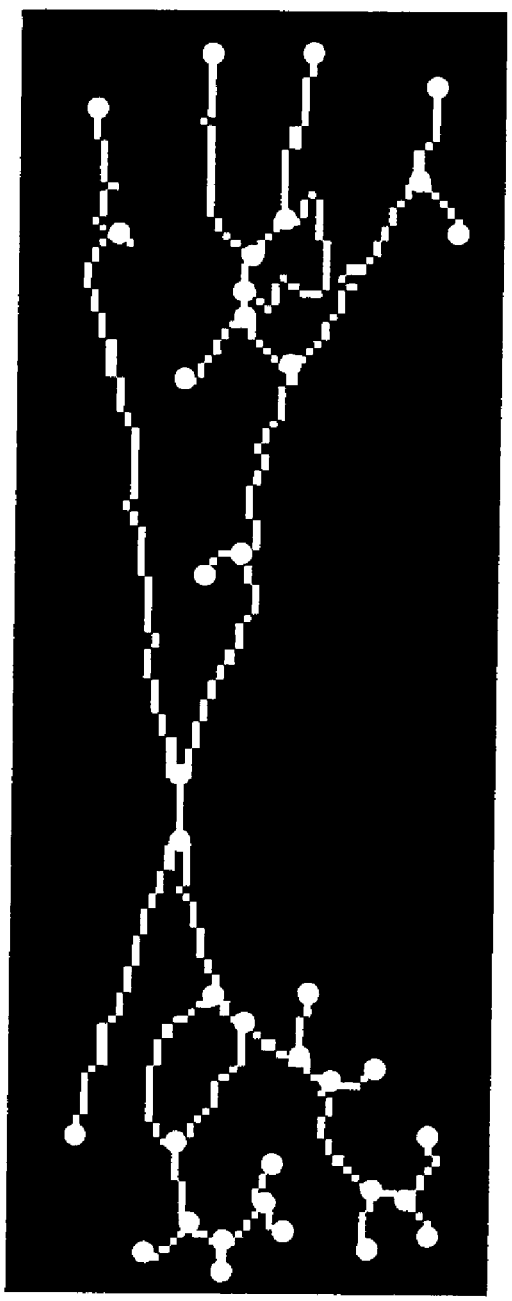
FIG. 6 is a schematic diagram illustrating an image in which end points and branch points are detected.

As described above, since the feature point detector 23 detects the feature points in accordance with the number of white pixels included in the region surrounding the white pixel in each of the blood vessel lines having the same line widths of one pixel, only the end points and the branch points are reliably detected as the feature points as shown in FIG. 6, for example, when compared with a case where a detection method called "Harris Corner", for example, is employed.

2-4. Tracing of Blood Vessel Lines

The blood vessel tracing unit 24 recognizes the relationships among the feature points by tracing the blood vessel lines with the feature points set as reference points. An example of a method for this tracing will be described in detail.

The blood vessel tracing unit 24 traces a blood vessel line connected to a branch point selected from among the feature points starting from the branch point until another feature point is detected, and recognizes that the detected other feature point and the branch point have a connection relationship.

Figure 7:
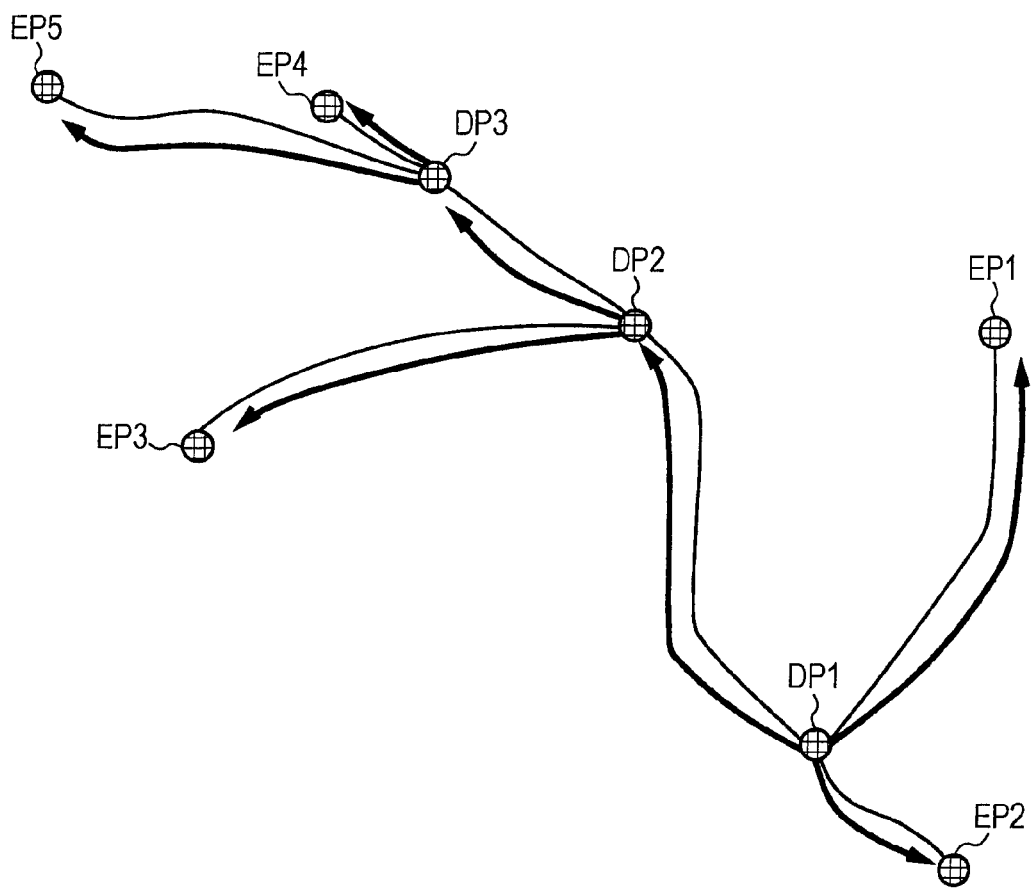
FIG. 7 is a schematic diagram used to describe detections of curve points using end points and branch points as references.

For example, in a case shown in FIG. 7, the blood vessel tracing unit 24 selects, from among branch points DP1, DP2, and DP3, the branch point DP1 which is a branch point located closest to a lower side of the image, for example, and traces blood vessel lines connected to the branch point DP1 until other respective feature points (end points EP1 and EP2 and the branch point DP2) are detected.

Furthermore, after tracing the blood vessel lines connected to the branch point DP1, the blood vessel tracing unit 24 selects the branch point DP2 which is a branch point second closest to the lower side of the image, and traces blood vessel lines connected to the branch point DP2 except for blood vessel lines which have been traced, until other feature points (an end point EP3 and a branch point DP3) are detected.

Furthermore, after tracing the blood vessel lines connected to the branch point DP2, the blood vessel tracing unit 24 selects the branch point DP3 which is a branch point third closest to the lower side of the image, and traces blood vessel lines connected to the branch point DP3 except for blood vessel lines which have been traced, until other feature points (end points EP4 and EP5) are detected.

As described above, the blood vessel tracing unit 24 recognizes that the feature points DP1 and EP1, the feature points DP1 and EP2, the feature points DP1 and DP2, the feature points DP2 and EP3, the feature points DP2 and DP3, the feature points DP3 and EP4, and the feature points DP3 and EP5 have respective connection relationships.

As described above, the blood vessel tracing unit 24 does not trace all the blood vessel lines connected to the branch points DP1, DP2, and DP3, but traces blood vessel lines connected to the branch points DP1, DP2, and DP3 except for blood vessel lines which have been traced in an order from a branch point closest to one of upper, lower, left, and right sides of the image. By this, overlapping tracing of the blood vessel line between the branch points DP1 and DP2 and the blood vessel line between the branch points DP2 and DP3 can be avoided. Consequently, processing load can be reduced by omitting unnecessary processing.

2-5. Extraction of Shape Parameters

The shape parameter extracting unit 25 extracts shape parameters of partial vessel lines which are located between pairs of feature points determined to have the connection relationship by the blood vessel tracing unit 24. An example of a method for this extraction will be described in detail.

The shape parameter extracting unit 25 selects each of the partial blood vessel lines as a target of processing in a predetermined order, and extracts, for each of the partial blood vessel lines which is selected, an angle (hereinafter referred to as a "partial line angle") formed by a line connecting the opposite ends of the partial blood vessel line with respect to a reference direction such as a vertical direction of the image, a length (hereinafter referred to as a "partial line length") of the partial blood line represented by the number of pixels included in the partial blood vessel line, and coefficients of terms (hereinafter referred to as a "second order coefficient sequence") of a quadratic curve of a polynomial representing the partial blood vessel line.

Specifically, when extracting the second order coefficient sequence, the shape parameter extracting unit 25 assigns points (hereinafter referred to as "blood vessel constituting points") included in the partial blood vessel line selected as the target of processing to the following polynomial of a quadratic curve.

$$y = p_1 x^2 + p_2 x + p_3 \tag{1}$$

For example, the number of blood vessel constituting points is m, m polynomials are obtained as follows.

$$y_1 = p_1 x_1^2 + p_2 x_1 + p_3$$
$$y_2 = p_1 x_2^2 + p_2 x_2 + p_3$$
$$|$$
$$y_m = p_1 x_m^3 + p_2 x_m + p_3 \qquad (2)$$

Note that "$p_2$", "$p_1$", and "$p_0$" in Equations (1) and (2) denote coefficients of terms corresponding to a second order, a first order, and a zero order, that is, a second order coefficient sequence.

Then, after assigning the blood vessel constituting points to Equation (1), the shape parameter extracting unit 25 changes second order coefficient sequences $p_2$, $p_1$, and $p_0$ of the polynomials, the number of second order coefficient sequences $p_2$, $p_1$, and $p_0$ corresponding to the number of blood vessel constituting points by the assignment, so as to extract second order coefficient sequences $p_2$, $p_1$, and $p_0$ in which differences between values of the left-hand side and values of the right-hand side of the polynomials are minimum.

As described above, the shape parameter extracting unit 25 extracts the second order coefficient sequences $p_2$, $p_1$, and $p_0$ when curves are the most approximated relative to the blood vessel constituting points of the partial blood vessel lines.

3. Blood Vessel Registration Mode

Figure 8:
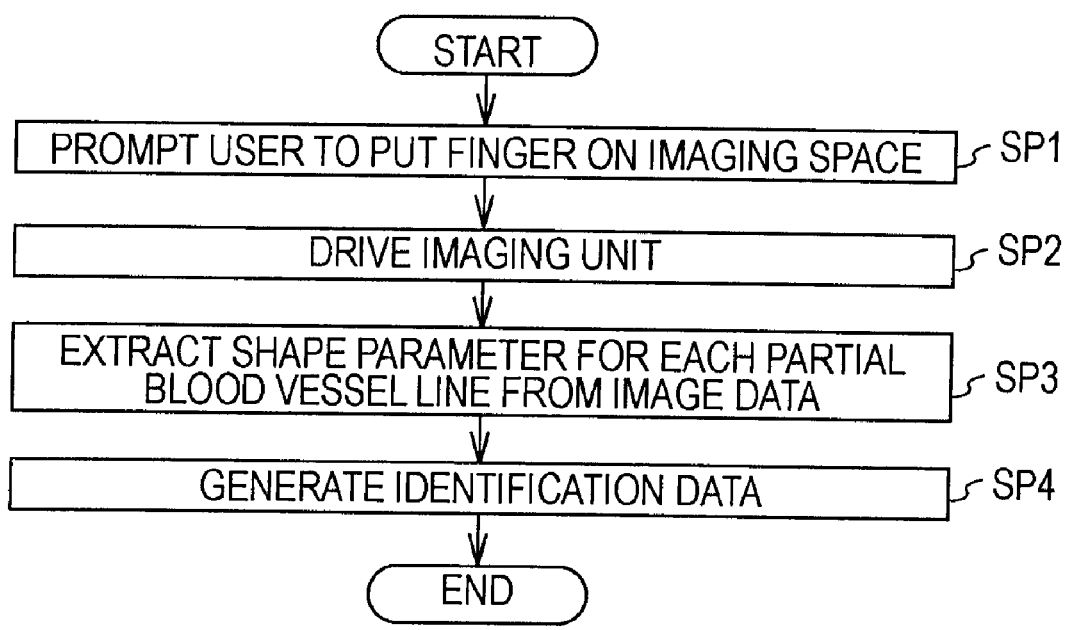
FIG. 8 is a flowchart illustrating a procedure of registration processing.

Next, the blood vessel registration mode will be described with reference to a flowchart shown in FIG. 8. When selecting the blood vessel registration mode as a mode to be executed, the controller 10 enters the blood vessel registration mode as an operation mode, and proceeds to step SP1.

The controller 10 instructs the notification unit 17 to transmit a notification representing that a finger should be put on the imaging space in step SP1, operates the camera included in the imaging unit 12 for image pickup, and turns on the near-infrared light source included in the imaging unit 12 in step SP2, and proceeds to step SP3.

In step SP3, the controller 10 instructs the image processor 13 to extract shape parameters (partial line angles, partial line lengths, and second order coefficient sequences) included in the blood vessel lines appearing in the image, for individual partial blood vessel lines, from the image data supplied from the imaging unit 12.

Then, when the image processor 13 extracted the shape parameters for individual partial blood lines, in step SP4, the controller 10 generates identification data using the shape parameters and positions of points of opposite ends of the partial blood vessel lines corresponding to the shape parameters, and registers the identification data in the memory 14. Then, this blood vessel registration mode is terminated.

The controller 10 executes the blood vessel registration mode as described above.

4. Data Configuration of Identification Data

Here, an example of a data configuration of the identification data is shown in FIG. 9. The identification data has a data configuration including a first file FL1 (hereinafter referred to as a "position file") representing positions of the feature points (the end points and the branch points) in the blood vessel lines and a second file FL2 (hereinafter referred to as a "parameter file") representing the shape parameters for individual partial lines of the blood vessel lines.

Assuming that the number of feature points is "N", the position file FL1 stores x-y coordinate values $(x_1, y_1)$, $(x_2, y_2)$, $(x_3, y_3)$, and $(x_N, y_N)$ representing positions of the feature points (the end points and the branch points).

On the other hand, assuming that the number of partial blood vessel lines is "M", the parameter file FL2 stores values representing indices $I_{S1}$, $I_{S2}$, $I_{S3}$ to $I_{SM}$ each of which is used to refer to a position of one of points of the opposite ends of a corresponding one of the partial blood vessel lines and values representing indices $I_{E1}$, $I_{E2}$, $I_{E3}$ to $I_{EM}$ each of which is used to refer to a position of the other point.

Furthermore, the parameter file FL2 stores values representing partial line angles $\theta_1$, $\theta_2$, $\theta_3$, to $\theta_M$, values representing partial line lengths $L_1$, $L_2$, $L_3$, to $L_M$, and values representing second order coefficient sequences $C_1$, $C_2$, $C_3$, to $C_M$.

Note that each of the values representing the second order coefficient sequences $C_1$, $C_2$, $C_3$, to $C_M$ correspond to one of the value of $p_2$, $p_1$, and $p_0$ in Equation (1).

The identification data has a data configuration in which the individual x-y coordinate values representing the points of the opposite ends of the partial vessel lines are not stored but the positions of the points of the opposite ends of the partial blood vessel lines are referred to using the x-y coordinate values representing the positions of the feature points (the end points and the branch points).

Assuming that a data configuration in which the positions of the points of the opposite ends of the partial blood vessel lines are stored is employed, since each of the branch points corresponds to ones of the points of opposite ends of two or more partial blood vessel lines, a number of x-y coordinate values representing the same position corresponding to a number of brunch points should be stored.

On the other hand, since the identification data has the data configuration in which the positions of the points of the opposite ends of the partial blood vessel lines are referred to using the x-y coordinate values representing the positions of the feature points (the end points and the branch points), stored x-y coordinate values do not represent identical positions. Accordingly, an amount of usage of the memory 14 can be reduced.

5. Authentication Mode

Next, the authentication mode will be described with reference to a flowchart of FIG. 10. When selecting the authentication mode as a mode to be executed, the controller 10 enters the authentication mode as the operation mode, and proceeds to step SP11.

The controller 10 instructs the notification unit 17 to transmit a notification representing that a finger should be put on the imaging space in step SP11, operates the camera included in the imaging unit 12 for image pickup, and turns on the near-infrared light source included in the imaging unit 12 in step SP12, and proceeds to step SP13.

In step SP13, the controller 10 instructs the image processor 13 to extract shape parameters (the partial line angles, the partial line lengths, and the second order coefficient sequences) included in the blood vessel lines appearing in the image, for individual partial blood vessel lines, from the image data supplied from the imaging unit 12.

Then, when the image processor 13 extracted the shape parameters for individual partial blood lines, the controller 10 reads the identification data from the memory 14 in step SP14, and instructs the collating unit 15 to collate the shape parameters extracted by the image processor 13 and positions of the points of opposite ends of the partial blood vessel lines corresponding to the shape parameters with the shape parameters and positions of the points of opposite ends of the partial blood vessel lines corresponding to the shape parameters which have been registered in the memory 14 as the identification data in step SP15.

Thereafter, the controller 10 determines whether an authentication can be given as a registrant in accordance with notification content transmitted from the collating unit 15 in step SP16, and performs processing in accordance with the determination.

That is, when a notification representing that displacement amounts of points of opposite ends of the partial blood vessel lines corresponding to the shape parameters are equal to or larger than a threshold value is transmitted from the collating unit 15, this means that similar relative positions of the end points and the branch points which are fundamental portions of the blood vessel lines are not obtained.

Furthermore, when similarity degrees of the shape parameters transmitted from the collating unit 15 are smaller than a reference value, this means that shapes of lines of portions when the blood vessel lines are recognized as the partial blood vessel lines with the end points and the branch points as reference points are not similar although the relative positions of the end points and the branch points which are the fundamental portions of the blood vessel lines are similar.

In this case, the controller 10 determines that the authentication as a registrant is not given, and visually or aurally transmits the determination through the display unit 17a and the audio output unit 17b.

On the other hand, when similarity degrees of the shape parameter transmitted from the collating unit 15 is equal to or larger than the reference value, this means that the relative positions of the end points and the branch points which are the fundamental portions of the blood vessel lines and the shapes of the lines of the portions when the blood vessel lines are recognized as the partial blood vessel lines with the end points and the branch points as reference points are similar, that is, the entire blood vessel lines are similar.

In this case, the controller 10 determines that the authentication as a registrant can be given, and transmits data representing that the authentication as a registrant has been given to a device connected to the interface 16. In this device, the data representing that the authentication as a registrant has been given triggers a predetermined process to be executed when the authentication is successfully performed, such as a process for locking a door for a predetermined period or a process for cancelling a restricted operation mode.

The controller 10 executes the authentication mode as described above.

6. Operation and Effects

As described above, the authentication device 1 extracts the parameters (shape parameters) representing shapes of the plurality of partial blood vessel lines obtained by dividing the blood vessel lines with the end points and the branch points as reference points for individual partial blood vessel lines, and generates the identification data including the shape parameter of the partial lines and positions of the opposite ends of the partial lines.

Accordingly, the authentication device 1 can discretely show, in addition to the points representing the features of the blood vessel lines, shapes of the blood vessel lines in a state in which the shapes have certain relationships with the blood vessel lines. Accordingly, the possibility of an error made in a determination such that a third party is determined as a certain person or a certain person is determined as a different person due to an external factor such as an environment of imaging operation or noise, or an internal factor such as difficulty of imaging of blood vessels in a live body (which is different between individuals) can be reduced, and consequently, authentication accuracy is improved. Furthermore, the amount of usage of the memory can be reduced.

In this embodiment, the authentication device 1 extracts three types of shape parameter, that is, the partial line angle, the partial line length, and the second order coefficient sequence. Accordingly, the authentication device 1 represents the partial blood vessel lines by directions as straight lines, lengths, and coefficients represented by the relationships with curves which approximate the partial blood vessel lines, that is, the authentication device 1 can represent the shapes of the partial blood vessel lines from three different viewpoints. Consequently, authentication accuracy is further improved.

With the configuration described above, since, in addition to the points representing the features of the blood vessel lines, the shapes of the blood vessel lines are discretely shown in a state in which the shapes have certain relationships with the blood vessel lines, adverse effects due to an external factor such as an environment of imaging operation or noise, or an internal factor such as difficulty of imaging of blood vessels in a live body (which is different between individuals) can be reduced, and consequently, the authentication device 1 which attains improved authentication accuracy is realized.

7. Other Embodiments

In the foregoing embodiment, the case where the blood vessel lines have the same line widths corresponding to one pixel is described. However, the present invention is not limited to this, and the blood vessel lines may have constant line widths other than the line widths corresponding to one pixel. Furthermore, processing for making the line widths of the blood vessel lines constant may be omitted.

Note that, in a case where the blood vessel lines have the constant line widths other than the line widths of one pixel, or in a case where the processing form making the line widths of the blood vessel lines constant is omitted, as shown in FIG. 3, the unique relationship between the "number" of white pixels around a pixel of interest which is a white pixel and the end points, the unique relationship between the "number" of white pixels around a pixel of interest and the branch points, and the unique relationship between the "number" of white pixels around a pixel of interest and the isolated points are not obtained.

Accordingly, in these cases, as a method for detecting the feature points, instead of the method for detecting the end points and the branch points in accordance with the number of white pixels located around the pixel of interest which is a white pixel, a detection method referred to as "Harris Corner", for example, should be used. By this, although accuracy is low when compared with accuracy using the detection method described in the foregoing embodiment, effects the same as those of the foregoing embodiment can be obtained.

Furthermore, in the foregoing embodiment, the case where the shape parameters of the partial blood vessel lines positioned between pairs of feature points (between pairs of feature points in which the connection relationships thereof are recognized by the blood vessel tracing unit 24) which have the connection relationships in a state in which the feature points are located nearest each other are extracted for individual partial blood vessel lines has been described. However, the present invention is not limited to this, and partial blood vessel lines having line lengths smaller than a predetermined line length, among the partial blood vessel lines, may be deleted so that remaining shape parameters of blood vessel lines are extracted for individual remaining partial blood vessel lines after the deletion. This means that as long as the feature points are determined as reference points, any method may be employed for dividing the blood vessel lines into a plurality of partial blood vessel lines.

Note that an example of a deletion method will be described. When detecting a partial blood vessel line having a length (the numbers of pixels) smaller than a predetermined threshold value from among the partial blood vessel lines located between the pairs of feature points which are determined that pairs of the feature points each have the connection relationships, the blood vessel tracing unit 24 determines whether ones of points of opposite ends of the partial blood vessel line is an end point.

Here, when one of points of opposite ends is an end point, this means that a corresponding partial blood vessel line is located in a terminal of a blood vessel line. In this case, the blood vessel tracing unit 24 recognizes that a degree of influence on the entire blood vessel lines is very small and reliability of the feature portion is poor, and deletes the partial blood vessel line except for a branch point included in the partial blood vessel line. Note that, in the example of FIG. 7, a partial blood vessel line positioned between the branch point DP2 and the end point EP4 is deleted except for the branch point DP2.

On the other hand, when one of the points of the opposite ends is not an end point, this means that the points of the opposite ends of the partial blood vessel line correspond to branch points and the partial blood vessel line is positioned in a middle region of the blood vessel line.

In this case, the blood vessel tracing unit 24 compares the number of partial blood vessel lines connected to one of the opposite ends with the number of partial blood vessel lines connected to the other of the opposite ends. When they are different from each other as shown in FIG. 11(A), the branch point which has a smaller number of partial blood vessel lines is deleted and the partial blood vessel line is deleted by being connected to the adjacent partial blood vessel lines.

In the example shown in FIG. 11(A), a partial blood vessel line PBLa is deleted by being connected to a partial blood vessel line PBLb so that a partial blood vessel line PBLa-b is formed, and is deleted by being connected to a partial blood vessel line PBLc so that a partial blood vessel line PBLa-c is formed.

On the other hand, when the numbers of the partial blood vessel lines are the same as each other as shown in FIG. 11(B), the blood vessel tracing unit 24 deletes a branch point in which the number of end points connected to partial blood vessel lines connected to the branch point is smaller than the number of end points connected to partial blood vessel lines connected to the other branch point, and the partial blood vessel line is deleted by being connected to the adjacent partial blood vessel lines.

In the example shown in FIG. 11(B), as with the example shown in FIG. 11(A), a partial blood vessel line PBLa is deleted by being connected to a partial blood vessel line PBLb so that a partial blood vessel line PBLa-b is formed, and is deleted by being connected to a partial blood vessel line PBLc so that a partial blood vessel line PBLa-c is formed.

As described above, the blood vessel tracing unit 24, for example, can delete a partial blood vessel line having a length smaller than a predetermined line length.

Furthermore, in the foregoing embodiment, the case where the partial line angle, the partial line length, and the second order coefficient sequence are extracted as shape parameters is described. However, in this invention, instead of all or some of the partial line angle, the partial line length, and the second order coefficient sequence, or in addition to the partial line angle, the partial line length, and the second order coefficient sequence, various other parameters such as a control point sequence of a Bezier function can be used. Note that the number of shape parameters may be one or two or more.

Furthermore, in the foregoing embodiment, a case where the number of extracted shape parameters is fixed is described. However, the present invention is not limited to this, and the number of extracted shape parameters may be changed in accordance with a degree of roughness of a shape of a corresponding partial blood vessel line.

An example of this changing method will be described. Every time selecting a partial blood vessel line to be processed, the shape parameter extracting unit 25 checks the number of intersections of the partial blood vessel line and a straight line connecting opposite ends of the partial blood vessel line. Then, when the number of intersections is equal to or larger than "0" and smaller than "2" which is a first range, the shape parameter extracting unit 25 sets the second order coefficient sequence as an object to be extracted from among the partial line angle, the partial line length, and the second order coefficient sequence and extracts the second order coefficient sequence.

On the other hand, when the number of intersections is equal to or larger than "2" and smaller than "5" which is a second range larger than the first range, the shape parameter extracting unit 25 sets the second order coefficient sequence and the partial line angle or the partial line length as objects to be extracted and extracts them.

On the other hand, when the number of intersections is equal to or larger than "5" which is a third range larger than the second range, the shape parameter extracting unit 25 sets the partial line angle, the partial line length, and the second order coefficient sequence as objects to be extracted and extracts them.

As described above, as the number of intersections of the partial blood vessel line and the straight line connecting the opposite ends of the partial blood vessel line is large, the shape parameter extracting unit 25 extracts a larger number of shape parameters by adding various shape parameters as objects to be extracted in addition to a shape parameter which is selected as an essential object to the extracted (the second order coefficient sequence obtained when the partial blood vessel line is subjected to quadratic curve approximation) in this example).

In this way, the shapes of the blood vessel lines can be specified further in detail while data amount is suppressed as small as possible.

Moreover, in the foregoing embodiment, the case where the coefficients of the terms when a partial blood vessel line is represented by the polynomial of the quadratic curve are extracted as the shape parameters is described. However, an order of the curve is not limited to the quadratic but any other order may be employed.

Furthermore, for coefficients of terms in a case where a partial blood vessel line is represented by polynomial of n-th order curve, a case where coefficients relative to an x direction are extracted as shown in Equation (1) is described. However, the present invention is not limited to this, and coefficients relative to a y direction may be obtained as follows.

$$x = p_1 y^2 + p_2 y + p_3 \qquad (3)$$

Note that since the blood vessel lines extend in substantially the same directions, coefficients relative to a direction the same as a direction in which the blood vessel lines extend are preferably obtained.

Furthermore, the case where the coefficients of the terms when a partial blood vessel line is represented by the polynomial of the n-th order curve are fixed, that is, an order of the curve is fixed is described above. However, they may be changed in accordance with roughness of the curve of the partial blood vessel line.

Specifically, for example, as the number of intersections of a straight line connecting opposite ends of a partial blood vessel line and the partial blood vessel line increases, an order of n-th order curve is set higher for extraction. In this way, coefficients representing the shapes of the blood vessel lines can be extracted in detail.

Note that setting may be performed such that as the number of intersections of the straight line connecting the opposite ends of the partial blood vessel line and the partial blood vessel line increases, the order of the n-th order curve is set larger and the number of extracted shape parameters increases.

Furthermore, in the foregoing embodiment, the case where the identification data (FIG. 9) having the data configuration including the position file FL1 and the parameter file FL2 is generated. However, the present invention is not limited to this, and an identifier representing that content (the shape parameters) of the parameter file FL2 is extracted through an extraction process performed by the shape parameter extracting unit 25 may be added as a header.

By this, it is easily proved that the shape parameters (the partial line angle, the partial line length, and the second order coefficient sequence) stored in the parameter file FL2 correspond to elements which have high reproducibility of the actual blood vessel lines.

Furthermore, in the case where the identifier is added to the identification data, when reading the identification data from the memory 14 in step SP14 (FIG. 10), the controller 10 determines whether the identifier representing that the content of the parameter file FL2 (FIG. 9) is extracted through the extraction process performed by the shape parameter extracting unit 25 has been added to the identification data. When the determination is negative, the authentication processing may be terminated after the identification data is removed from the memory 14.

By this, collation using shape parameters other than the shape parameters extracted with extraction accuracy of a predetermined level can be avoided and deterioration of accuracy of authentication can be prevented beforehand.

Furthermore, in the foregoing embodiment, the case where the registration processing or the authentication processing is executed in accordance with a program stored in the ROM. However, the present invention is not limited to this, and the registration processing or the authentication processing may be executed in accordance with a program installed from a program storage medium such as a CD (Compact Disc), a DVD (Digital Versatile Disc), or a semiconductor memory or a program downloaded from a program provision server through the Internet.

Furthermore, in the foregoing embodiment, the case where the authentication device 1 having an imaging function, a collation function, and a registration function is employed is described. However, the present invention is not limited to this, and devices may be provided for individual functions or a device may be provided for part of the functions.

INDUSTRIAL APPLICABILITY

The present invention is usable in a biometrics authentication field.

| EXPLANATION OF REFERENCE | |
|---|---|
| 1: | AUTHENTICATION DEVICE |
| 10: | CONTROLLER, |
| 11: | OPERATION UNIT, |
| 12: | IMAGING UNIT, |
| 13: | IMAGE PROCESSOR, |
| 14: | MEMORY, |
| 15: | COLLATING UNIT, |
| 16: | INTERFACE, |
| 17: | NOTIFICATION UNIT, |
| 21: | PREPROCESSOR, |
| 22: | PATTERNING UNIT, |
| 23: | FEATURE POINT DETECTOR, |
| 24: | BLOOD VESSEL LINE TRACING UNIT, |
| 25: | SHAPE PARAMETER EXTRACTING UNIT |

The invention claimed is:

1. A registering device characterized by comprising: extracting means for extracting parameters representing shapes of partial lines when each of the partial lines is represented by a polynomial of an n-th order curve obtained by dividing a blood vessel line appearing in an image by setting end points and branch points of the blood vessel line as reference points, wherein the extracting means sets a number of types of parameters to be extracted, as a number of intersections of one of the partial lines with a straight line connecting points of opposite ends of the one of the partial lines increases; and generating means for generating data including the parameters of the partial lines and positions of points of opposite ends of the partial lines.

2. The registering device according to claim 1, characterized in that the extracting means extracts, when each of the partial lines is represented by polynomial of an n-th order curve, coefficients of terms and an angle defined by a straight line connecting opposite ends of the partial line relative to a reference direction, and a length of the partial line, or the angle and the length.

3. The registering device according to claim 1 characterized in that the extracting means extracts coefficients of terms when each of the partial lines is represented by polynomial of an n-th order curve, and sets order of the n-th order curve higher, as the number of intersections of a straight line connecting points of opposite ends of each of the partial lines increases.

4. The registering device according to claim 3 characterized in that the extracting means sets the order of the n-th order curve higher and sets a larger number of types of parameters to be extracted except for the coefficients, as the number of intersections of the straight line connecting the opposite ends of each of the partial lines increases.

5. A collating device characterized by comprising: storing means for storing data including parameters representing shapes of partial lines when each of the partial lines is represented by a polynomial of an n-th order curve obtained by dividing a blood vessel line appearing in an image by setting end points and branch points of the blood vessel lines as reference points and positions of points of the opposites ends of the partial lines, wherein a number of types of parameters is a number of intersections of one of the partial lines with a straight line connecting points of opposite ends of the one of the partial lines increases; and collating means for collating the parameters and the points of the opposite ends of the partial lines with collation targets as elements for a discrimination of a registrant.

6. The collating device according to claim 5 characterized in that the collating means collates the points of the opposite ends of the partial lines with the points serving as the collation targets, and collates the parameters of the partial lines with parameters serving as collation targets when displacement amounts of the points are equal to or larger than an allowable limited amount.

7. The collating device according to claim 5 characterized in that the collating means stops collation with the collation objects when an identifier representing that the parameters have been extracted through a predetermined extraction process is not included in the data.

8. The collating device according to claim 7 characterized in that as the number of intersections of the straight line connecting the opposite ends of the partial lines increases, a larger number of types of parameters are set to be extracted in the extraction process.

9. A non-transitory computer readable medium storing instructions for causing a computer to perform functions, comprising:
 extracting parameters representing shapes of partial lines when each of the partial lines is represented by a polynomial of an n-th order curve obtained by dividing a blood vessel line appearing in an image by setting end points and branch points of the blood vessel line as reference points, wherein a number of types of parameters to be extracted is a number of intersections of one of the partial lines with a straight line connecting points of opposite ends of the one of the partial lines increases; and generating data including the parameters of the partial lines and positions of points of opposite ends of the partial lines.

10. A data configuration of identification data generated as an object to be registered characterized in that
 the identification data has a configuration including parameters representing shapes of partial lines obtained by dividing a blood vessel line appearing in an image by setting end points and branch points of the blood vessel line as reference points and positions of points of opposite ends of the partial lines, wherein a number of types of parameters is a number of intersections of one of the partial lines with a straight line connecting points of opposite ends of the one of the partial lines and
 the parameters and the points of the opposite ends of the partial lines are used as elements for discrimination of a registrant when processing for collation with objects to be collated is performed.

11. The data configuration according to claim 10 characterized in that
 the parameters representing the shapes of partial lines obtained by dividing a blood vessel line appearing in an image by setting end points and branch points of the blood vessel line as reference points and information used to refer to the positions of the points of the opposite ends of the partial lines are stored for individual partial lines obtained by dividing a blood vessel line appearing in an image by setting end points and branch points of the blood vessel line as reference points are stored in a single file, and the positions of the end points and the branch points are stored in a file serving as the object to be referred to.

12. The data configuration according to claim 10 characterized in that when the points of the opposite ends of the partial lines are collated with points serving as collation targets and it is determined that displacement amounts of the points are equal to or larger than an allowable limited amount, the identification data is used for processing for collating the parameters of the partial lines with parameters serving as collation targets.

13. The data configuration according to claim 10, wherein the identification data has a configuration including the parameters, the points of the opposite ends of the partial lines, and an identifier representing that the parameters have been extracted through a predetermined extraction process, and in the extraction process, for each of the partial line, the larger the number of intersections with a straight line connecting the opposite points of the partial line is, the larger the number of extracted parameters are set.

* * * * *